United States Patent [19]

Barr

[11] Patent Number: 4,516,032

[45] Date of Patent: May 7, 1985

[54] ELECTRO-OPTICAL IMAGING SYSTEM

[75] Inventor: Colin Barr, Kildrum, Scotland

[73] Assignee: Burroughs Corporation, Detroit, Mich.

[21] Appl. No.: 333,202

[22] Filed: Dec. 21, 1981

[30] Foreign Application Priority Data

Dec. 22, 1980 [GB] United Kingdom ............... 8041058

[51] Int. Cl.³ ............................................. H01J 40/14
[52] U.S. Cl. ..................................... 250/578; 250/216
[58] Field of Search ............... 250/216, 208, 209, 578, 250/211 J; 350/331 R; 357/29, 30, 31; 358/212, 213

[56] References Cited

U.S. PATENT DOCUMENTS

| | | | |
|---|---|---|---|
| 3,885,861 | 5/1975 | Farnsworth et al. | 350/331 R |
| 3,904,818 | 9/1975 | Kovac | 250/211 J |
| 3,970,778 | 7/1976 | Adkins | 250/578 |
| 4,338,514 | 7/1982 | Bixby | 250/578 |
| 4,383,170 | 5/1983 | Takagi et al. | 250/216 |

FOREIGN PATENT DOCUMENTS 1437328 5/1976 United Kingdom .
1440791 6/1976 United Kingdom .
1592500 7/1981 United Kingdom .

*Primary Examiner*—David C. Nelms
*Attorney, Agent, or Firm*—Kevin R. Peterson; Edmund M. Chung; Mark T. Starr

[57] ABSTRACT

An electro-optical imaging system uses a charge-coupled bucket-brigade photo-sensitive image convertor where the necessity for light shielded shift registers and other measures for preventing the acquisition of additional incident-light induced charge by light-representative electrical charge packets as they pass to the output port of the convertor is removed by the use of a liquid crystal light transmission cell which can be made transparent for the acquisition of charge by the convertor and opaque for the shifting of the charges to the output port. The convertor can thus be made simpler and of smaller area to give a lower cost and higher production yield. The convertor is given an apparently increased spatial resolution by providing that the cell allows sub-areas of the total image to be transmitted one-by-one to the convertor by the sequential operation of four sub-cells of the main cell such that each sub-cell becomes transparent and has its through-passing image converted in turn.

26 Claims, 4 Drawing Figures

ELECTRO-OPTICAL IMAGING SYSTEM

BACKGROUND TO THE INVENTION

1. Field of the Invention

The present invention relates to an electro-optical imaging system for converting an optical image into an electrical signal representative thereof.

2. The Prior Art

Electro-optical imaging systems are widely used in applications ranging from real-time video to character recognition in documents used in association with data processing systems.

An important class of such systems involves the use of a bucket-brigade charge-coupled image convertor. Such convertors are well known in the art and comprise one or more shift-register coupled chains of photosensitive elements where each of the elements can accumulate electrical charge representative of the light incident thereon and where the electrical charge so accumulated can be passed down the chain or chains, from element to element to an output port. The image to be electro-optically converted is focused onto the chain or chains of elements, a time is allowed for the electrical charge to accumulate, and then the charges are moved, as output, to the port.

Those areas which receive little light during the charge accumulation period accumulate little electrical charge, and those areas which receive much light accumulate larger electrical charges. The movement of the charges down a chain does not inhibit the charge accumulation process. Thus, a charge packet from an element in receipt of a dim portion of the image can pass through an element which is in receipt of a bright portion. The amount of charge in the package is added to, the amount of addition being greater the further from the port that the charge originating element lies. This process degrades the sharpness of edges in the image the effect being known as "smearing" and further limits the dynamic range of the charge-coupled device by placing a lower limit on the darkness representative signal.

In order to reduce the spurious charge accumulation effect various modifications have been applied to the design of the charge-coupled device. In a first scheme each chain of photo-sensitive, charge accumulating elements has provided, in parallel therewith, a shift register chain which is shielded from the light. The accumulated charges are first shifted in parallel into the light shielded chain and thereafter moved, serially down the light shielded chain, to the port. In a second scheme intermediate light-immune storage is provided on the charge coupled device. The charges from the photo-sensitive chain are shifted very rapidly into the intermediate storage so that the amount of time of exposure to extraneous charge-accumulating light in other elements is minimized. Thereafter the charges, or representations thereof, can be presented to the output port at a desired rate of presentation by their retrieval from the intermediate storage. While both of these schemes are successful in eliminating or reducing the accumulation of unwanted charge, they both have the disadvantage of requiring the addition of further elements onto a photosensitive device whose cost is already high and where the areal density of photosensitive elements is generally required to be increased rather than decreased.

The fabrication of such charge coupled devices has, in common with the fabrication of all other semiconductor devices, an individual device fabrication failure rate which rises steeply with the area of the device. The elimination of such extra structures on a charge-coupled photo-imaging convertor would reduce the area of the device. This real reduction would be of particular use in those devices where plural rows of photo-receptive elements are serially accessed to provide representation of whole areas of images. The increased yield of these large-area devices would considerably reduce their cost.

In one area of use of electro-optical imaging systems, namely the machine reading of documents, it is usual to employ a single-chain charge-coupled image convertor, the image of the document to be read being focused onto the single chain and the document swept across the field of view so that the image of the document is obtained as a series of strips akin to a television picture. While the single chain image converter is of a relatively low cost, it ideally still requires the addition of spurious charge accumulation preventative measures as described, and its use requires the inclusion of mechanical components for moving the document or its image. Such components presenting cost, precision and reliability problems.

It is a problem that the number of photosensors per unit area in charge-coupled, bucket-brigade electro-optical image convertors is sometimes not sufficient for adequate resolution of the components in an image. The image can be focused, at increased size, onto more than one device, but this can prove costly and the resulting, fainter incident image can cause signal to noise ratio problems.

Accordingly, it is desirable to provide an electro-optical image converting system wherein the accumulation of spurious charge, as described, is preventable without recourse to additional structures on the device itself. It is further desirable to provide such an image convertor which is free of mechanical moving parts. It is yet further desirable to provide such an image convertor where the resolution can be improved over that obtainable using a single charge coupled device without recourse to the use of more than one charge coupled device.

SUMMARY OF THE INVENTION

The term "portion of an image" is hereinafter used to define a distorted or non-distorted sub-area of a larger image area.

The term "charge coupled image convertor" is hereinafter used to define a photosensitive, semiconducting device comprising a plurality of semiconducting sites each of which can accumulate an electrical charge representative of the light incident thereon wherein an ordered sequence of the plurality of charges from said plurality of sites, or a representation thereof, can be moved to an output port.

According to a first aspect, the present invention consists in an optical imaging system characterized by a light transmitting switch being operable to allow an image to be incident upon a charge coupled image convertor for the accumulation of electrical charges thereon, and to reduce the incidence of light onto said converter during the movement of said charges to the output port of said convertor.

According to another aspect the present invention consists in an optical imaging system characterized by a light transmitting switch being operable to allow the incidence of selectable portions of an image onto a charge coupled image convertor for the accumulation of electrical charges thereon, and to reduce the incidence of light onto said converter during the moving of said charges to the output port of said convertor.

BRIEF DESCRIPTION OF THE PREFERRED EMBODIMENTS

The invention is hereinafter described with reference to an automatic document reader. It is to be understood that this represents only an example of its use and not a limitation thereon.

In a first preferred embodiment a focusing system throws an image, preferably that of a stationary document, onto the surface of a bucket-brigade charge-coupled electro-optical image convertor preferably comprising a plurality of chains of photosensitive elements. A light transmitting cell is preferably interposed in the path of the image to the convertor, preferably between the focusing system and the convertor. The cell is preferably operable to transmit light for the accumulation of charges on the converter and to prevent the through-passage of light for the shifting of charges to the part of the convertor. The cell is preferably a liquid crystal device.

In a second preferred embodiment an electro-optical image convertor comprises a light transmitting cell interposed between an object, preferably a stationary document, whose image is to be converted, and a plural element focusing system. The cell preferably comprises a corresponding plurality of areas any one of which is uniquely selectably operable to allow the transmission of light. Each of the areas on the cell preferably provides the light at one of the elements of the focusing system. Each of the elements of the focusing system preferably focuses its input image portion, from its corresponding area to the cell, onto the surface of a charge coupled image convertor. The cell is preferably operable to allow each of its areas in turn to provide an image portion for focusing onto the convertor for charge accumulation, and to prevent the incidence thereof of any image portion for movement of the charges towards and out of the port of the convertor. The light cell preferably comprises a plural, independently operable area liquid crystal device. The plural element focusing system preferably comprises a plurality of mirror pairs each in association with a lens. There are preferably four such mirror pairs and lense combinations.

The invention is further explained, by way of an example, by the following description in conjunction with the appended drawings, in which:

Figure 1:
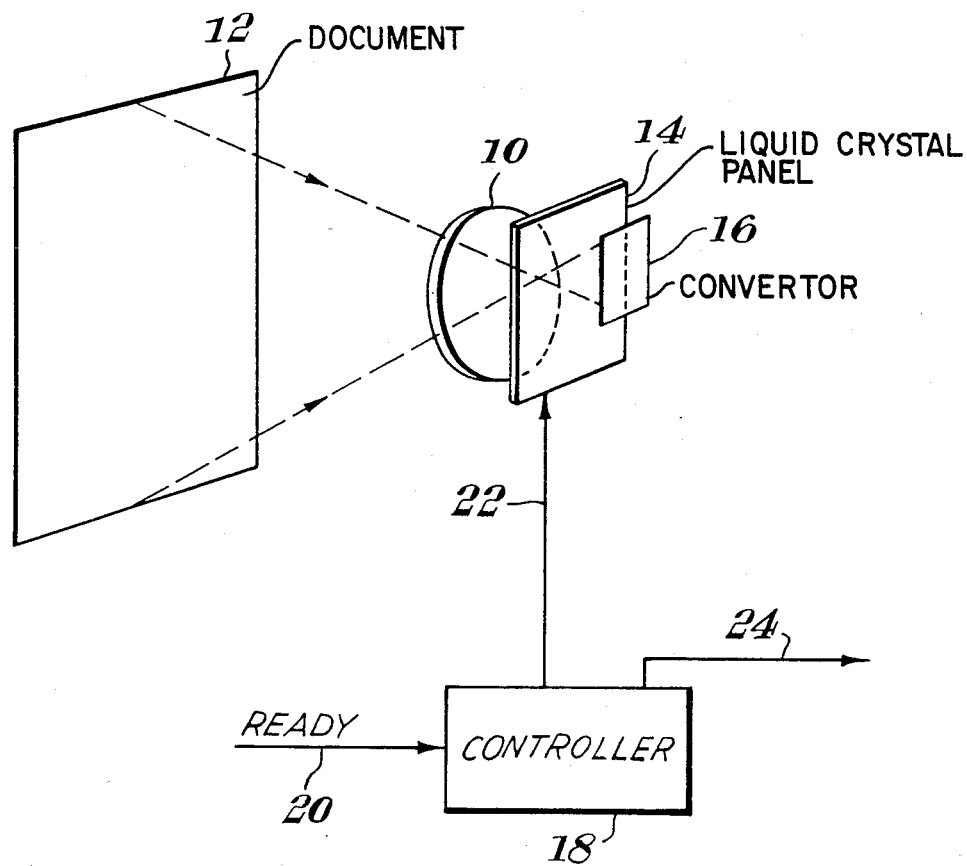
FIG. 1 shows the first preferred embodiment.

A lens 10 throws an image of a document 12 through a light transmitting liquid crystal panel 14 onto a charge-coupled image converter 16. A controller 18 receives a ready signal on an input line 20. The ready signal is indicative of a request for commencement of image conversion and can be derived from a detector for the presence and correct positioning of the document 12, from an operator usable switch or the like, or from any external controller such as a supervisory data processing system. The controller 18 provides a panel controlling output on the panel control line 22 whereby it can cause the panel to be opaque or transparent. The controller 18 also provides an output on the shifting initialising line 24 whereby it can signal to whatever apparatus controls the shifting of the charge packets from the convertor 16 that the shifting should begin.

On receipt of the ready signal the controller 18 causes the panel 14 to be transparent for a predetermined time. The controller 18 thereafter causes the panel to become opaque and signals the commencement of charge shifting on the initialising line 24.

Those skilled in the art will appreciate that the time during which the panel 14 is transparent can be controlled in response to the overall brightness of the image, and that the controller 18 can be inhibited from commencing its image converting routine until whatever equipment is controlling the movement of the charge packages from the convertor 16 has completed its task.

Figure 2:
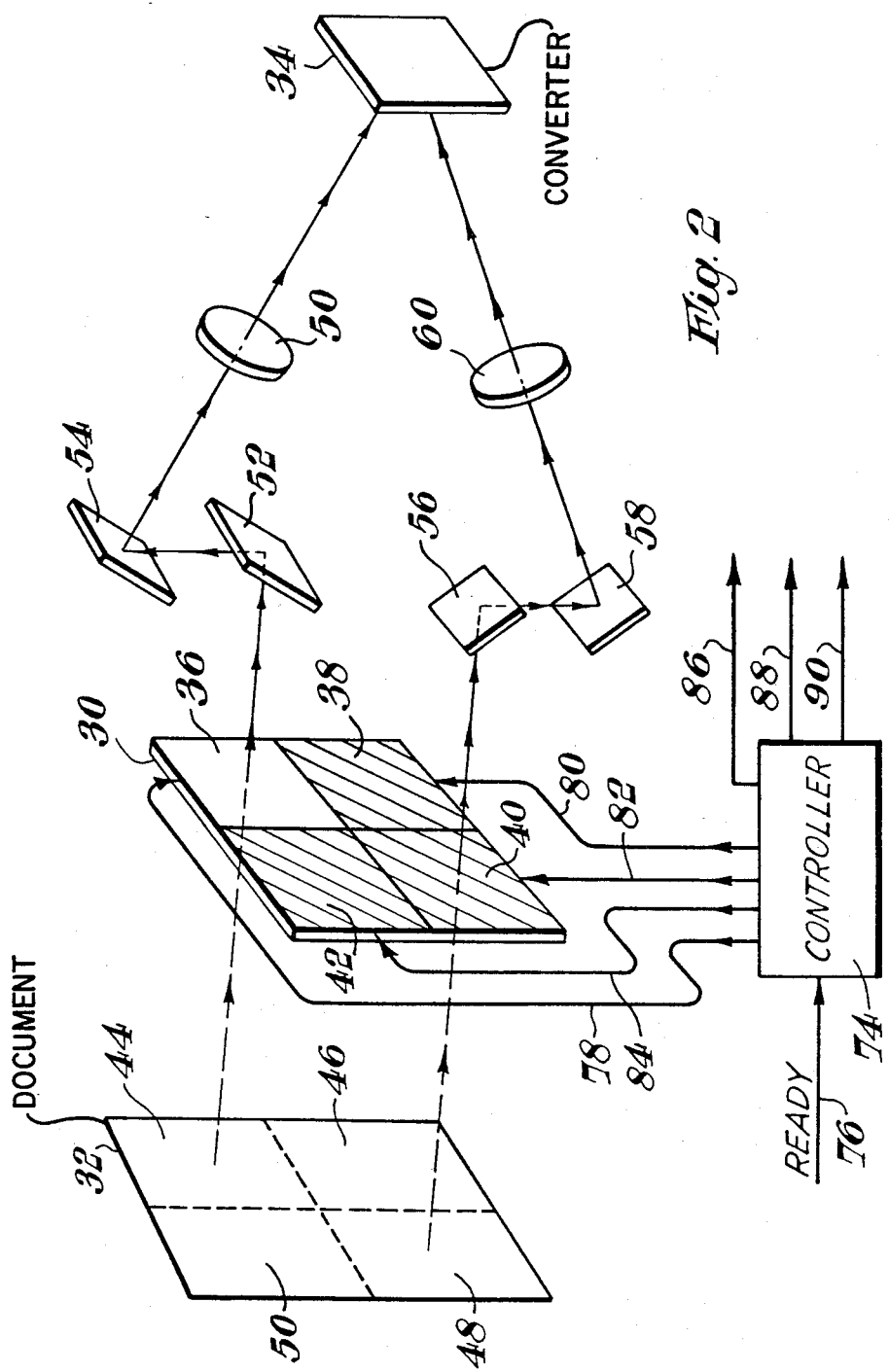
FIG. 2 shows the second preferred embodiment.

FIG. 2 shows the second preferred embodiment.

A liquid crystal light transmitting cell 30 is interposed between a document 32 on which an electro-optical image conversion is to be performed, and a bucket-brigade charge-coupled image converter 34. The cell 30 is divided into four sub-cells 36, 38, 40, 42. Each of the sub-cells 36, 38, 40, 42 is independently operable to be either transparent or opaque. When the first sub-cell 36 is transparent, it allows an image from a first portion 44 of the document 32 to fall on the convertor 34. When the second sub-cell 38 is transparent it allows an image from a second portion 46 of the document 32 to fall on the convertor 34. When the third sub-cell 40 is transparent it allows an image from a third portion 48 of the document 32 to fall on the convertor. When the fourth sub-cell 42 is transparent it allows an image from a fourth portion 50 of the document 32 to fall onto the convertor 34.

The precise image on the convertor 34 is formed using a kind of periscope and lens arrangement for each of the sub-cells 36, 38, 40, 42. A first mirror 52, inclined to the path of the light from the first portion 44 of the document 32 through the first sub-cell 36, sends the light to a second mirror 54 which is inclined to the path of the light from the first mirror 52. The second mirror 54 sends the light through a first lens 50 which focuses an image of the first portion 44 of the document 32 onto the face of the convertor 34. Similarly, a third mirror 56, a fourth mirror 58 and a second lens 60 focus the image of the third portion 48 of the document 32, as seen through the third sub-cell 40, onto the face of the convertor 34. Four further mirrors and two further lenses are used to focus the image of the second portion 46 of the document 32, as seen through the second sub-cell 38, onto the convertor 34 and to focus the image of the fourth portion 50 of the document 32, as seen through the fourth sub-cell 42, onto the convertor 54. These are omitted for clarity, from FIG. 2.

Figure 3:
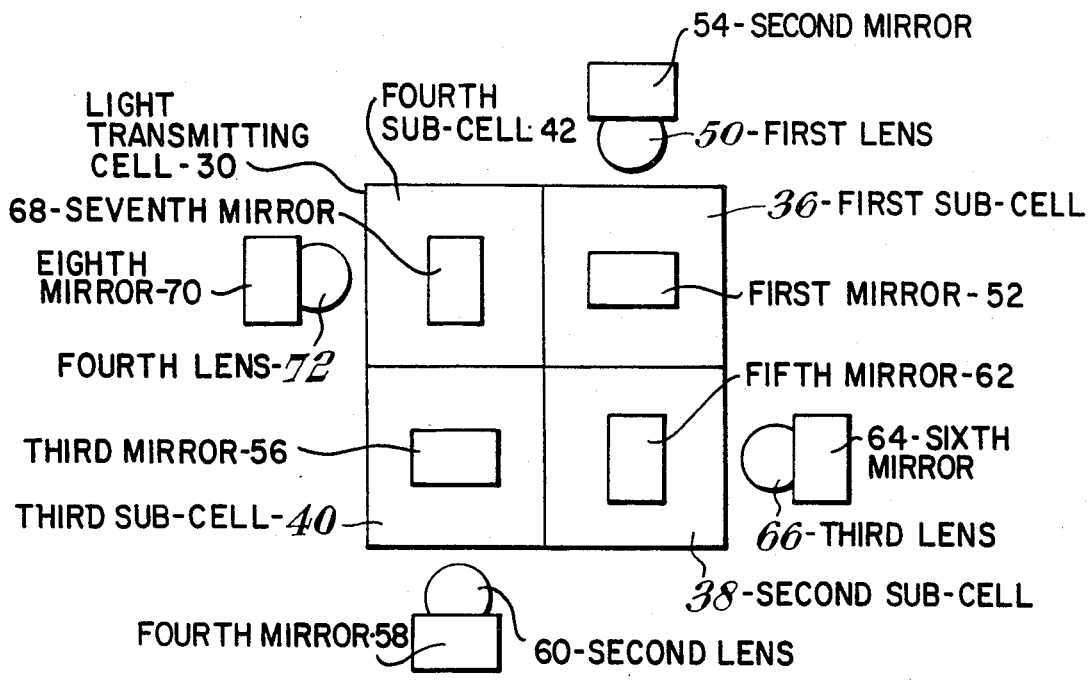
FIG. 3 shows the complete arrangement of mirrors and lenses in the second preferred embodiment.

FIG. 3 shows the arrangement of the eight mirrors, including those omitted from FIG. 2, together with the four lenses, used for image formation of the convertor 34, the whole being seen looking from the document 32 towards the cell 30.

The additional features of note over those of FIG. 2 are a combination of a fifth mirror 62, a sixth mirror 64 and a third lens 66 for focusing the image of the second portion 46 of the document 32 as seen through the second sub-cell 38 onto the convertor 34, and a combination of a seventh mirror 68 an eighth mirror 70 and a fourth lens 72 for focusing the image of the fourth portion 50 of the document 32 as seen through the fourth sub-cell 42, onto the convertor 34.

Attention is drawn back to FIG. 2. A controller 74 is in receipt of a ready signal on an input line 76 in the same manner as the controller 18 of the first preferred embodiment shown in FIG. 1. The ready signal, as before, indicates that it is time to commence an electro-optical image conversion on the document 32.

The controller 74 controls the first sub-cell 36 by means of a first cell control line 78, controls the second sub-cell 38 via a second cell control line 80, controls the third sub-cell 40 via the third cell-control line 82, and controls the fourth sub-cell 42 via the fourth cell control line 84. The controller 74 can make any of the sub-cells 36, 38, 40, 42 transparent or opaque. The controller 74 can signal to whatever apparatus controls the shifting of charges from the convertor 34 that it is time to start the shifting, by means of a signal on the initialise line 86. The controller 74 can further indicate to whatever apparatus controls the shifting of the charges from the convertor 34 from which of the four portions 44, 46, 48, 50 the image, the representation of which is being shifted out of the convertor 34, was derived, the indication being provided by means of a two bit binary number on first and second portion indicator lines 88, 90.

In operation, on receipt of the ready signal, the controller 74 makes one of the sub-cells 36, 38, 40, 42 transparent and the rest opaque. This situation lasts for a predetermined time, at the end of which light intensity indicating charges have accumulated on the convertor 34. The controller 74 then causes all of the sub-cells 36, 38, 40, 42 to become opaque and signals via the initialise line 86 that the representation of the image should be shifted out of the convertor 34 while indicating which of the four sub-cells 36, 38, 40, 42 provided the image. The controller 74 then either awaits for a second predetermined period until it is sure that the charges have been shifted from the convertor 34, or waits until the charge-shifting controlling apparatus signals back that the shifting of the charges is complete via a feedback link not shown, before making another of the sub-cells 36, 38, 40, 42 transparent and the rest opaque. The process is repeated in its entirety until all of the sub-cells 36, 38, 40, 42 have had a turn at providing the image for the convertor 34. Thereafter the controller 74 waits, with all sub-cells 36, 38, 40, 42 opaque, for another ready signal.

It is to be appreciated that other optical systems may readily be used to replace the combinations of mirrors and lenses here shown and that more or less than four portions and sub-cells might be employed. Not all of the area of the document 32 need be viewed by the convertor 34. Certain areas of no interest can be omitted. The cells in both the first and second embodiments can be any other selectably operable image transmitting cell and need not employ a liquid crystal. The document in both the first and second embodiments can be replaced by any other object of whose image it is desired to produce an electrical representation.

It is to be noted that the sub-images obtained by the operation of the second preferred embodiment cannot be exactly butted onto one another because of paralax errors therebetween. It will be apparent to those skilled in the art that numerous methods can be used, if desired, to correct for such errors in image handling data processing equipment. Alternatively abuttable sub-images can be obtained by the replacement of the lens and mirror system of FIGS. 2 and 3 by any image collimator interposed between the cell 30 and the document 32.

Figure 4:
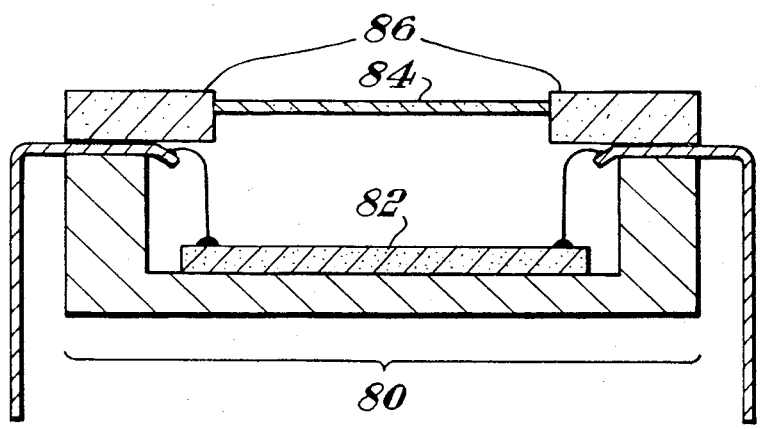
FIG. 4 shows a cross-sectional view of an integrated circuit package containing a charge-coupled, bucket-brigade image convertor together with an integral liquid-crystal light transmission cell over its sensitive surface.

FIG. 4 shows how some of the elements of the system of the first preferred embodiment shown in FIG. 1 can be combined.

An integrated circuit package 80 contains a bucket-brigade charge-coupled photo-image convertor 82 whose sensitive area is covered by a selectably-operable light-transmitting cell 84 which could, for example, comprise a liquid crystal and which is integral with the cover 86 of the package 80.

What I claim is:

1. An optical imaging system for providing an electrical representation of an image, comprising:
   image converter means for accumulating electrical charges representative of said image;
   switch means, positioned between said image and said converter means, said switch means having a first state for allowing the incidence of said image onto said converter means and a second state for restricting the incidence of said image onto said converter means;
   said converter means for accumulating said electrical charges frepresentative of said image only when said switch means is in said first state, said converter means further for moving said electrical charges to an output port of said converter means without accumulating further electrical charges when said switch means is in said second state; and
   control means, coupled to said switch means, for providing a first command signal to switch said switching means to said first state for a first predetermined period of time and thereafter providing a second command signal to switch said switching means to said second state for a second period of time.

2. The optical imaging system in accordance with claim 1 wherein said image converter means includes a charge-coupled image converter and said switch means includes a light-transmitting switch.

3. The optical system in accordance with claim 1 wherein said control means further includes means for providing a third command signal to said converter means for causing said converter means to accumulate said electrical charges representative of said image and a fourth command signal to said converter means for causing said converter means to move said electrical charges to said output port of said converter means.

4. The optical system in accordance with claim 3 wherein said control means provides said first and third command signals simultaneously and provides said second and fourth command signals simultaneously.

5. The optical imaging system according to claim 1 wherein said switch means includes a liquid crystal cell.

6. The optical imaging system according to claim 5 wherein said converter means includes a charge-coupled bucket brigade semiconductor device.

7. The optical imaging system according to claim 3 wherein said control means further includes means for providing an output signal at the end of said second period of time.

8. The optical scanning system according to claim 3 further including a focusing system for focusing said image onto said converter means and wherein said switch means is interposed between said focusing system and said image converter means.

9. The optical scanning system according to claim 6 wherein said charge-coupled bucket brigade semiconductor device is an integrated circuit package, and wherein said liquid crystal cell is intergral with the cover of said package.

10. The optical imaging system according to claim 1 wherein said switch means includes a plurality of liquid crystal cells.

11. An optical imaging system for providing an electrical representation of a selected portion of an image, said image including a plurality of portions, said system comprising:
 converter means for accumulating electrical charges representative of said selected image portion;
 a plurality of switch means, corresponding in number to said plurality of image portions, positioned between said image and said converter means, each one of said plurality of switch means having a first state for allowing the incidence of a different one of said plurality of image portions onto said converter means and a second state for restricting the incidence of said different one of said plurality of image portions onto said converter means;
 a plurality of focusing means, corresponding in number to said plurality of image portions, positioned between said plurality of switch means and said converter means, each one of said focusing means for focusing a different one of said plurality of image portions onto said converter means; and
 control means, coupled to said plurality of switch means, for providing a first signal to switch the one of said plurality of switch means corresponding to said selected image portion to said first state for a first predetermined period of time and thereafter providing a second signal to switch the one of said plurality of switch means corresponding to said selected image portion to said second state for a second period of time.

12. The system in accordance with claim 11 wherein said control means further includes means for providing a third signal, simultaneous with said first signal, to switch each of the plurality of said switch means not corresponding to said selected image portion to said second state for said first and second time periods.

13. The system in accordance with claim 12 wherein said control means further includes means for:
 providing a fourth signal, simultaneous with said second signal, for indicating that the representation of the selected image portion should be shifted out of said converter means; and
 providing an indication of which image portion is then represented in said converter means.

14. The system in accordance with claim 12 wherein an optically unobstructed path is provided between said image and said plurality of switch means.

15. The system in accordance with claim 12 wherein each of said focusing means includes a first mirror, inclined to the path of light from one portion of the image through a corresponding one of said plurality of switch means, a second mirror inclined to the path of light from the first mirror, the second mirror for sending the path of light through a lens which focuses said one image portion onto said converter means.

16. The system in accordance with claim 12 wherein said control means further includes means, responsive to the receipt of a ready signal, for sequentially choosing a first one of said plurality of image portions as said selected image portion, and, after providing said indication of which image portion is represented in said converter means, choosing a second different image portion as said selected image portion.

17. The system in accordance with claim 12 wherein:
 said converter means includes a charge coupled bucket brigade semiconductor device; and
 each one of said plurality of switch means includes a liquid crystal cell.

18. An optical imaging system for providing an electrical representation of an image, comprising:
 image converter means for accumulating electrical charges representative of light incident thereon;
 a plurality of switch means, positioned between said image and said converter means, each one of said switch means having a first state for allowing the incidence of a different portion of said image onto said converter means and a second state for restricting the incidence of said different portion of said image onto said converter means;
 a plurality of focusing means, corresponding in number to said plurality of switch means, positioned between said plurality of switch means and said converter means, each one of said focusing means for focusing the portion of said image passing through one of said switch means onto said converter means; and
 control means, coupled to said plurality of switch means, for executing a control sequence which includes the selection of each one of said switch means in turn, after the selection of one of said switch means the provision of a first signal to switch the selected switch means to said first state for a first predetermined time period and thereafter the provision of a second signal to switch said selected switch means to said second state.

19. The system in accordance with claim 18 wherein said control sequence further includes the provision of a third signal to switch the non-selected switch means to said second state simultaneously with said first signal.

20. The system in accordance with claim 19 wherein said control means includes means wherein said second signal is effective to switch said selected switch means to said second state for a second predetermined time period and said third signal is effective to switch the non-selected switch means to said second state for said first and second predetermined time periods.

21. The system in accordance with claim 20 wherein said control sequence further includes the provision of a fourth signal to said converter means for causing said converter means to move said accumulated electrical charges to an output port of said converter means.

22. The system in accordance with claim 21 wherein said control means further includes means operable to provide an output signal indicative of the completion of the execution of said control sequence.

23. The system in accordance with claim 18 wherein an optically unobstructed path is provided between said image and said plurality of switch means.

24. The system in accordance with claim 18 wherein each of said focusing means includes a first mirror, inclined to the path of light from a portion of the image through one of said plurality of switch means, a second mirror inclined to the path of light from the first mirror, the second mirror for sending the path of light through a lens which focuses the portion of the image onto said converter means.

25. The system in accordance with claim 18 wherein:
said converter means includes a charge coupled bucket brigade semiconductor device; and
each one of said plurality of switch means includes a liquid crystal cell.

26. The system in accordance with claim 21 wherein:
said converter means includes a charge coupled bucket brigade semiconductor device; and
each one of said plurality of switch means includes a liquid crystal cell.

* * * * *